United States Patent [19]

Shiobara et al.

[11] Patent Number: 5,182,351
[45] Date of Patent: Jan. 26, 1993

[54] THERMOSETTING RESIN COMPOSITIONS

[75] Inventors: Toshio Shiobara; Hisashi Shimizu, both of Annaka, Japan

[73] Assignee: Shin-Etsu Chemical Co., Ltd., Tokyo, Japan

[21] Appl. No.: 580,668

[22] Filed: Sep. 11, 1990

[30] Foreign Application Priority Data

Sep. 11, 1989 [JP] Japan .................................. 1-235305

[51] Int. Cl.⁵ ............................................. C08F 30/08
[52] U.S. Cl. ................... 526/279; 526/262; 528/26; 528/32
[58] Field of Search .................. 526/262, 279; 528/27, 528/28

[56] References Cited

U.S. PATENT DOCUMENTS 3,988,505  10/1976  Evans et al. ........................... 526/59

FOREIGN PATENT DOCUMENTS 52-994  6/1977  Japan.

OTHER PUBLICATIONS

English Abstract of Japanese Patent Application Kokai No. 52-994.

Primary Examiner—Melvyn I. Marquis
Assistant Examiner—David E. Aylward
Attorney, Agent, or Firm—Birch, Stewart, Kolasch & Birch

[57] ABSTRACT

A thermosetting resin composition comprising a maleimide having at least one N-substituted maleimide group in the molecule thereof and a silicon compound having conjugated double bonds is easily workable and yields cured products having improved heat resistance.

18 Claims, No Drawings

THERMOSETTING RESIN COMPOSITIONS

The present invention relates to thermosetting resin compositions having improved workability and heat resistance.

BACKGROUND OF THE INVENTION

Thermosetting resins have been widely used as various electrical insulating materials, structural materials, adhesives and the like using casting, impregnating, laminating, and molding techniques. In recent years, severer requirements have been imposed on the materials used in these applications. Inter alia, heat resistance is an important requirement.

Thermosetting polyimide resins generally used as thermosetting resin are quite resistant against heat, but poor in processing since they must be heated at high temperatures for a long period of time upon working. In turn, epoxy resins modified for heat resistance improvements are easy to process, but insufficient in mechanical properties at high temperatures, electrical properties, long-term thermal degradation resistance, and heavy-duty heat resistance.

Several replacements for these thermosetting resins are known, for example, a thermosetting mixture containing a polyimide and an alkenylphenol or alkenylphenol ether (see Japanese Patent Application Kokai No. 994/1977), and a heat resistant resin composition containing a maleimide compound, a poly(allylated phenol) compound and an epoxy resin (see Japanese Patent Application Kokai No. 184099/1983). The poly(allylated phenol) compounds used in these compositions have a nuclearly substituting allyl group and a hydroxyl or ether group attached to a common aromatic ring at ortho positions, because they result from Claisen rearrangement of a poly(allyl ether) compound or have the structure that a phenolic hydroxyl group is generated through Claisen rearrangement during thermosetting. Therefore, they tend to remain unreacted, particularly in resin compositions of the novolak type, leaving problems regarding setting properties and thermal degradation resistance at high temperatures.

SUMMARY OF THE INVENTION

Therefore, an object of the present invention is to provide a thermosetting resin composition which is easy to process and cures into products having improved heat resistance.

According to the present invention, there is provided a thermosetting resin composition comprising in admixture, (a) a maleimide compound having at least one N-substituted maleimide group in its molecule and (b) a silicon compound having conjugated double bonds.

This thermosetting resin composition is well workable with low stresses and highly bondable, and products cured therefrom have excellent heat resistance including good mechanical strength at high temperatures and hot water resistance.

In general, compounds having an N-substituted maleimide group are highly affective for imparting heat resistance, but thermosetting resin compositions having such compounds blended therein are unsatisfactory in long-term heat resistance, adhesion and workability. Quite unexpectedly, by using a maleimide group-containing compound having a structural unit of formula (I) in combination with a silicon compound having conjugated double bonds, that is, by incorporating a silicon compound into a maleimide, there can be obtained cured products which are improved in long term heat resistance, adhesion and the like.

DETAILED DESCRIPTION OF THE INVENTION

The thermosetting resin composition of the invention includes (a) a maleimide compound having at least one N-substituted maleimide group in its molecule.

Preferred are maleimides of the following formula (I):

In formula (I), substituent R is an n-valent organic group and letter n is an integer of from 1 to 20, preferably from 1 to 6, more preferably equal to 2. In the case of $n=2$, the divalent organic groups represented by R include a halogen-substituted or unsubstituted divalent aliphatic hydrocarbon group having 1 to 15 carbon atoms, a halogen-substituted or unsubstituted divalent aromatic hydrocarbon group having 6 to 20 carbon atoms, a halogen-substituted or unsubstituted alkylene arylene group consisting of these two, and these organic groups partially having a functional group such as ether, thioether, sulfoxide, and sulfone. Examples of substituent R are shown below.

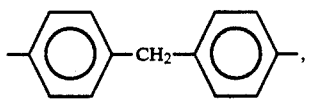

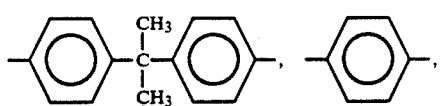

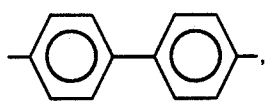

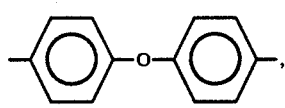

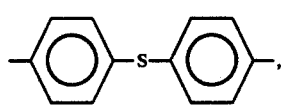

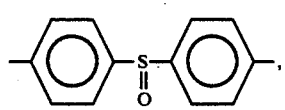

-continued

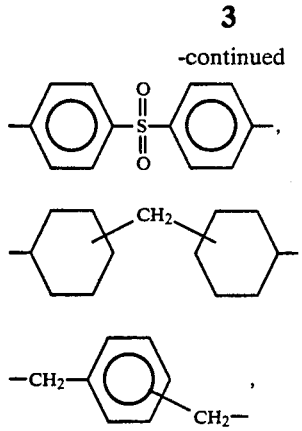

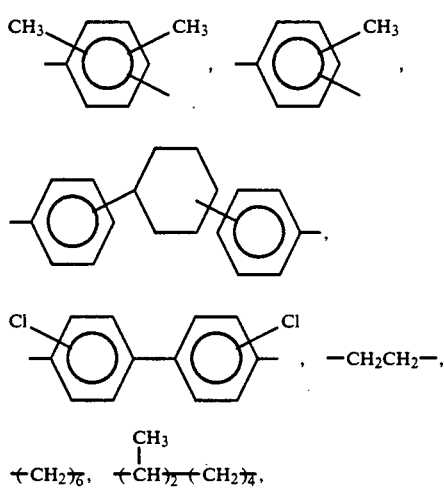

In the last formula, R' is a hydrogen atom, a $C_{1-4}$ alkyl group or a halogen atom, and m is an integer of from 0 to 18.

Several illustrative, non-limiting examples of the compounds having an N-substituted maleimide group include N,N'-bismaleimides such as
N,N'-diphenylmethane bismaleimide,
N,N'-phenylene bismaleimide,
N,N'-diphenyl ether bismaleimide,
N,N'-diphenyl sulfone bismaleimide,
N,N'-dicyclohexylmethane bismaleimide,
N,N'-xylene bismaleimide,
N,N'-tolylene bismaleimide,
N,N'-xylylene bismaleimide,
N,N'-diphenylcyclohexane bismaleimide,
N,N'-dichlorodiphenyl bismaleimide,
N,N'-(2,2-diphenylpropane) bismaleimide,
N,N'-diphenyl ether bismaleimide,
N,N'-diphenyl sulfone bismaleimide,
N,N'-ethylene bismaleimide,
N,N'-hexamethylene bismaleimide,
N,N'-(dimethylhexamethylene) bismaleimide, etc.;
prepolymers obtained by adding diamines to these N,N'-bismaleimides, the prepolymers being terminated with an N,N'-bismaleimide skeleton; and maleimide derivatives of aniline and formalin condensates.

Other useful maleimide compounds are compounds of the following formula:

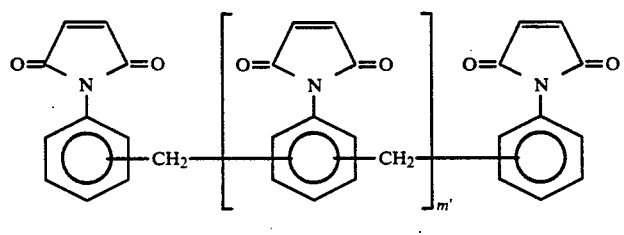

wherein m' is an integer of 0 to 18, and mixtures of an N-substituted monomaleimide, N-substituted trimaleimide or N-substituted tetramaleimide and an N-substituted bismaleimide. Maleimide compounds as mentioned above, but modified with silicones are also useful.

In the practice of the invention, these maleimides may be used along or in admixture of two or more. Among others, N-substituted trimaleimides and N-substituted bismaleimides, especially N,N'-dipheylmethane bismaleimide are preferred.

The thermosetting resin composition of the invention also includes (b) a silicon compound having conjugated double bonds. Typical are silicon compounds having attached to a silicon atom thereof a group having conjugated double bonds such as an α,β-unsaturated bond-containing organic group having 4 to 10 carbon atoms as exemplified by

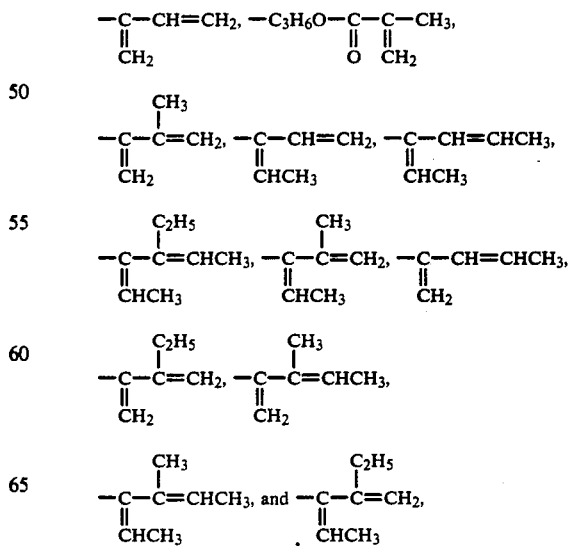

and silicon compounds having a double bond conjugated with an aromatic ring, represented by the general formula:

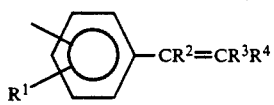

wherein $R^1$ is a hydrogen atom, a halogen atom or a halogen-substituted or unsubstituted alkyl group having 1 to 6 carbon atoms, and $R^2$, $R^3$ and $R^4$ are independently selected from a hydrogen atom and an alkyl group having 1 to 4 carbon atoms, for example, such as

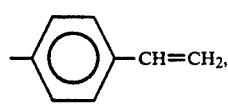

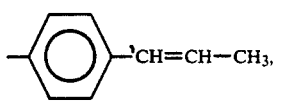

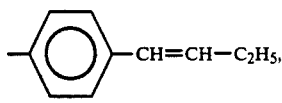

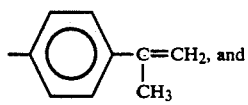

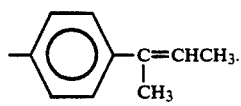

Illustrative of these silicon compounds are compounds of the following formulae (1) through (10).

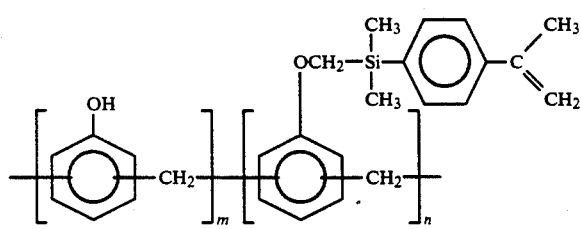
(1)

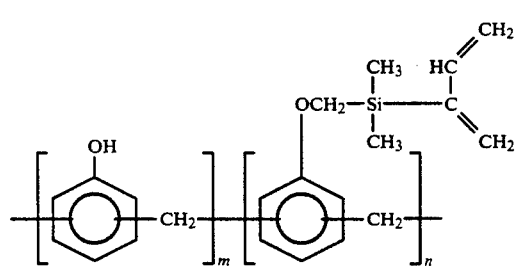
(2)

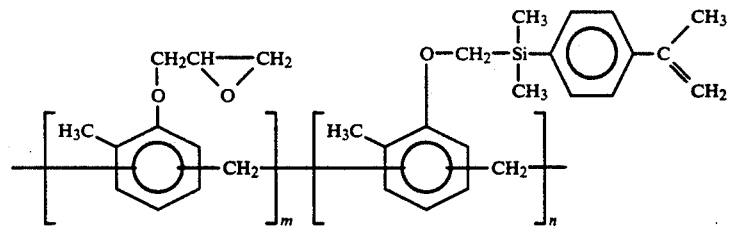
(3)

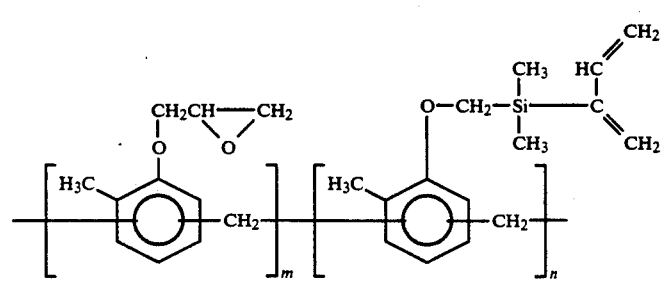
(4)

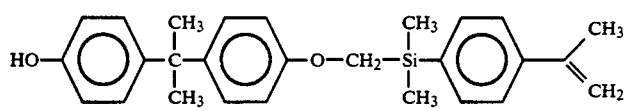 (5)

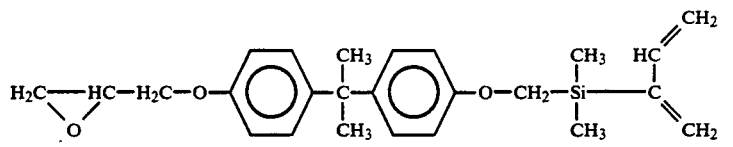 (6)

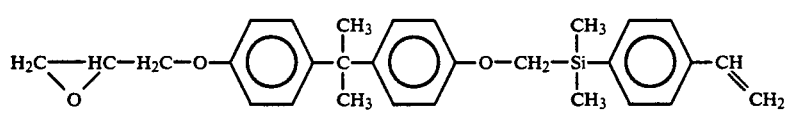 (7)

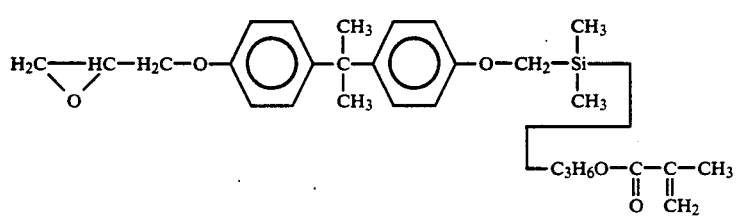 (8)

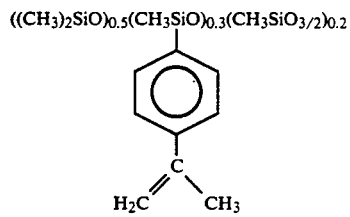 (9)

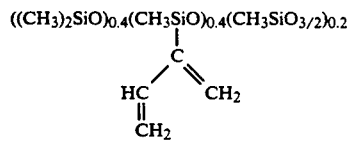 (10)

Other useful silicon compounds having conjugated double bonds are copolymers of a novolak resin having conjugated double bonds and an organopolysiloxane represented by the general formula:

$$R^5_a R^6_b SiO_{(4-a-b)/2} \quad (II)$$

wherein $R^5$ is a hydrogen atom, a halogen atom or an organic group having a functional group, $R^6$ is a substituted or unsubstituted monovalent hydrocarbon group having 1 to 10 carbon atoms, a is a number of from 0.001 to 0.25, b is a number of from 1.75 to 2.0, and $1.7 < a + b < 2.3$ and wherein the number of silicon atoms per molecule is an integer of from 20 to 1,000 and the number of organic groups having a functional group directly attached to a silicon atom per molecule is an integer of from 1 to 5. Use of such a copolymer is effective in providing relatively stress-free compositions.

Typical examples of the novolak resin having conjugated double bonds are compounds having an alkenyl group of the following formulae (11) through (14).

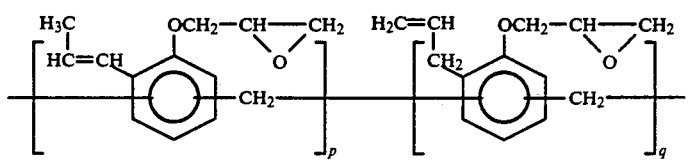 (11)

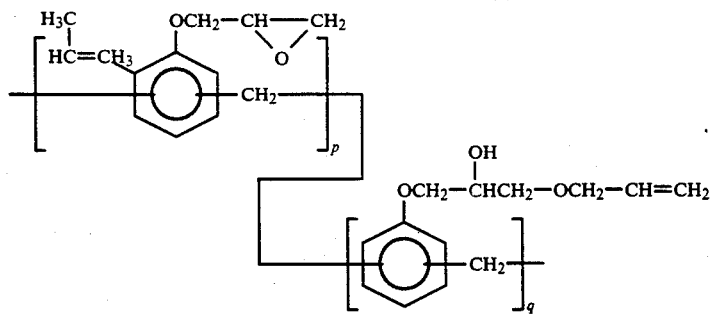
(12)

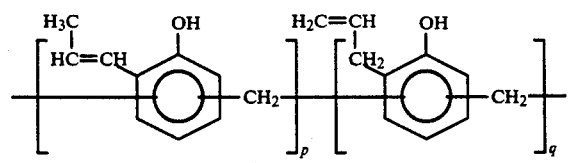
(13)

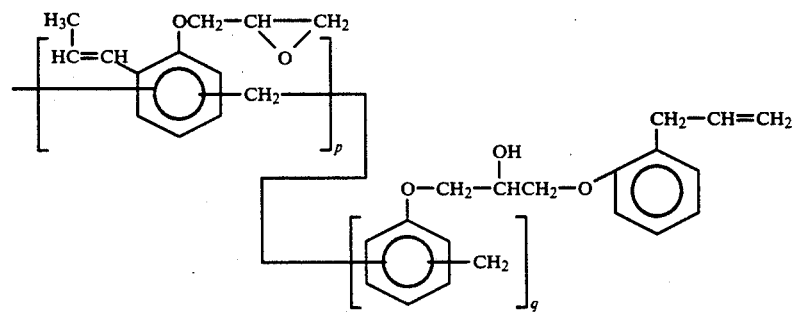
(14)

In formulae (11) through (14), p and q are integers in the ranges: $1 < p < 20$ and $1 \leq q \leq 10$.

These alkenyl group-containing resins are easily prepared by any conventional synthetic methods, typically by epoxidizing an alkenyl group-containing phenolic resin with epichlorohydrin or by partially reacting 2-allylphenol or a similar reactant with any of well-known epoxy resins.

The organopolysiloxanes with which the novolak resin having conjugated double bonds is reacted are preferably those of formula (II) wherein $R^5$ is a hydrogen atom, a halogen atom, or an organic group having a functional group selected from the class consisting of a γ-aminopropyl group, a γ-glycidoxypropyl group, and a γ-(θ-hydroxyphenyl)propyl group, $R^6$ is a substituted or unsubstituted monovalent hydrocarbon group, typically a $C_{1-6}$ alkyl group or a phenyl group. The preferred ranges of a and b are $0.015 \leq a \leq 0.06$, $1.93 \leq b \leq 1.98$, and $1.9 < a+b < 2.0$.

Typical examples of the organopolysiloxanes are compounds of the following formulae (15) through (20).

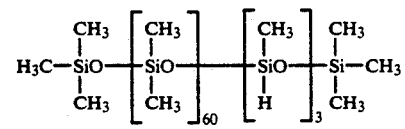
(15)

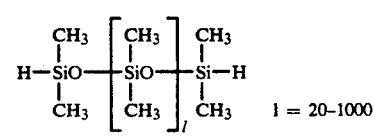
(16)   $l = 20-1000$

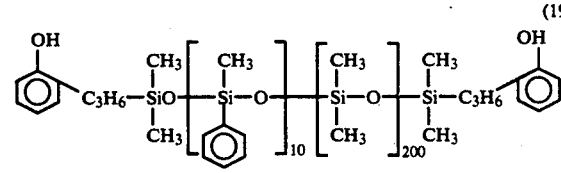
(17)

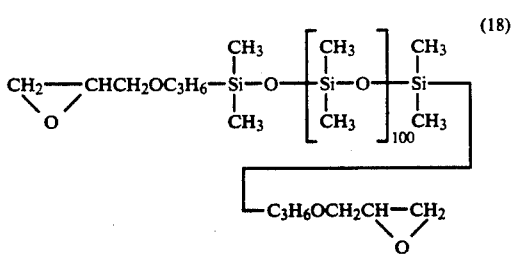
(18)

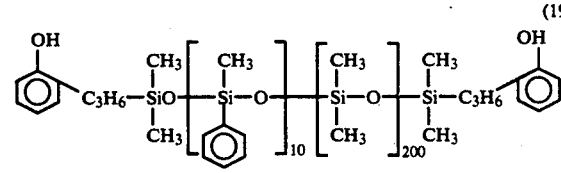
(19)

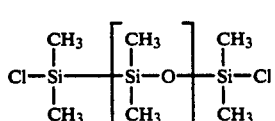
(20)

These organopolysiloxanes should have a degree of polymerization of from 20 to 1,000, preferably from 30 to 300. A degree of polymerization of lower than 20 fails to provide flexibility and high glass transition temperature whereas with a degree of polymerization of higher than 1,000, synthesis becomes very difficult and a copolymer, if obtained, cannot be easily dispersed, failing to achieve the objects of the invention.

In general, for organopolysiloxanes having the same silicon content, a higher degree of polymerization leads to better crack resistance and a higher glass transition temperature, but less dispersion and lower adhesion to substrates, typically semiconductor elements. For improved dispersion and adhesion to substrates, it is effective and desirable to introduce not only a methyl group, but also a propyl, phenol or alkoxy group into the substituted or unsubstituted monovalent hydrocarbon group represented by $R^6$.

The novolak resin having conjugated double bonds and the organopolysiloxane, both as defined above, may be reacted by any methods commonly used for the preparation of copolymers including dehydrochlorination between a phenolic hydroxyl group in the former and a chlorine atom in the latter, hydrosilylation between an alkenyl group in the former and an SiH group in the latter, addition reaction between an epoxy group in the former and an amino group in the latter, and addition reaction between an epoxy group in the former and a phenolic hydroxyl group in the latter.

In the practice of the invention, functional ratio B/A is preferably from 8/10 to 4/10, more preferably from 7/10 to 6/10 wherein A is the quantity of vinyl group in the maleimide or component (a) and B is the quantity of vinyl group in the silicon compound having conjugated double bonds or component (b) (typically, a silicon compound-modified resin or organopolysiloxane copolymer). If functional ratio B/A is higher than 8/10, which means a too large of a proportion of the vinyl group associated with the silicon compound, more reactants would remain unreacted, giving rise to a curing problem. If functional ratio B/A is lower than 4/10, which means a too small of a proportion of the vinyl group associated with the silicon compound, there would arise problems in molding and mechanical strength.

In the practice of the invention, the maleimide or component (a) and the silicon compound having conjugated double bonds or component (b) are blended in such amounts that the composition contains 100 parts by weight of component (a) and 20 to 400 parts by weight, especially 50 to 200 parts of component (b). If component (b) is less than 20 parts by weight, the resulting composition would become less moldable or workable and less resistant against cracking. If component (b) exceeds 400 parts by weight, the glass transition temperature and long-term heat resistance of the composition would be lowered, due to a lesser proportion of the maleimide component being present.

Where the organopolysiloxane copolymer is used as component (b) in the composition of the invention, the quantity of the organopolysiloxane moiety in the organopolysiloxane copolymer is preferably controlled so as to range from 1 to 30 parts by weight, more preferably from 2 to 10 parts by weight per 100 parts by weight of the maleimide or component (a) plus the novolak resin having conjugated double bonds forming part of component (b). If the quantity of the organopolysiloxane moiety is smaller than 1 part, the resulting composition would show a low glass transition temperature and poor crack resistance. More than 30 parts of the organopolysiloxane moiety would adversely affect the mechanical strength of the composition.

In the practice of the invention, a catalyst is preferably blended in the composition in a catalytic amount to insure complete crosslinking bond between the compound having an N-substituted maleimide group of formula (I) and the silicon compound having conjugated double bonds (typically, a silicon compound-modified resin or organopolysiloxane copolymer). The catalytic amount is generally 0.01 to 10 parts by weight, preferably 0.1 to 2 parts by weight per 100 parts by weight of the total of components (a) and (b). The catalysts are typically organic peroxides, for example, such as benzoyl peroxide, para-chlorobenzoyl peroxide, 2,4-dichlorobenzoyl peroxide, capryl peroxide, lauroyl peroxide, acetyl peroxide, methyl ethyl ketone peroxide, cyclohexanone peroxide, bis(1-hydroxycyclohexyl peroxide), hydroxyheptyl peroxide, tert.-butyl hydroperoxide, p-methane hydroperoxide, cumene hydroperoxide, di-tert.-butyl.-peroxide, dicumyl peroxide, 2,5-dimethyl-2,5-di(tert.-butyl peroxide) hexane, 2,5-dimethylhexyl-2,5-di(peroxybenzoate), tert.-butyl perbenzoate, tert.-butyl peracetate, tert.-butyl peracetate, tert.-butyl peroctoate, tert.-butyl peroxyisobutyrate, and di.tert.-butyl-diperphthalate alone and mixtures thereof. Co-catalysts, for example, imidazole and its derivatives, tertiary amine derivatives, phosphine derivatives, and cycloamidine derivatives may be used in combination with the catalyst.

The thermosetting resin compositions of the invention may further contain inorganic fillers if desired. The inorganic fillers may be blended in commonly used amounts, often ranging from 50 to 700 parts by weight, preferably from 100 to 400 parts by weight per 100 parts by weight of the total of components (a) and (b), while the identity of filler is not critical. They may be used either alone or in admixture of two or more. Therefore, the type and amount of inorganic fillers may be suitably selected depending on a particular application of the thermosetting resin composition. Examples of the inorganic filler include natural silica including crystalline silica and amorphous silica, synthetic pure silica, synthetic spheroidal silica, talc, mica, silicon nitride, boron nitride, and alumina.

The composition of the invention may further contain any desired additives, if desired, depending on its purpose and application. Acceptable additives include mold release agents such as waxes and fatty acids such as stearic acid and metal salts thereof, pigments such as carbon black, dyes, antioxidants, flame retardants, and surface-treating agents such as γ-glycidoxypropyltrimethoxysilane. Further, epoxy resins, phenolic resins or amine curing agents may be additionally used if necessary and desirable.

The thermosetting resin compositions may be prepared by combining and mixing predetermined amounts of the necessary components as previously mentioned, milling the mixture in a milling device preheated at 70 to 95° C., for example, a kneader, roll mill and extruder, cooling and comminuting. The order of blending the components is not critical.

The thermosetting resin compositions of the invention are useful molding materials and powder coating materials and will find additional applications in the encapsulation of semiconductor devices such as IC, LSI, transistors, thyristors, and diodes and manufacture of printed circuit boards. For example, the compositions may be transfer molded at a temperature of 150 to 200° C. and a pressure of 50 to 150 kgf/cm² for a time of 1 to 10 minutes, and post-cured at a temperature of 150 to 250° C.

EXAMPLE

Examples of the present invention are given below together with Comparative Examples by way of illustration and not by way of limitation. All parts and percents are by weight unless otherwise stated.

First, the synthesis of components used in Examples are described.

Synthesis 1

A four-necked flask equipped with a thermometer, agitator, dropping funnel and reflux condenser was charged with a base resin and a silicon compound as reported in Table 1 and then with 155 parts by weight of methyl isobutyl ketone solvent to thoroughly dissolve the resin. The flask was heated to a reaction temperature of 110° C. while 114 parts (0.8 equivalents) of 28% caustic soda in water was added dropwise over two hours. The flask was maintained at the reaction temperature for a further 8 hours. After the aqueous layer was removed by decantation, the organic layer was washed several times with water, azeotropically dewatered, removed of a trace amount of inorganic salt by filtration, and concentrated, yielding silicon compound-modified resins having conjugated double bonds (reaction products A to E) whose percent silylation and OH equivalent are shown in Table 1.

The structure of reaction products A to E were identified by IR and NMR spectra.

TABLE 1

| | Reaction product Silicon compound-modified | Base resin (part) | Silicon compound* (part) | Silylation (%) | OH equiv | Viscosity of product (150° C.): centipoise |
|---|---|---|---|---|---|---|
| A | [structure with $CH_3$–Si–$CH_3$, O–$CH_2$–phenyl–C($CH_3$)=$CH_2$, phenyl-OH backbone]$_n$ | [phenol-$CH_2$]$_n$–OH (107) | Cl–$CH_2$–Si($CH_3$)$_2$–phenyl–C($CH_3$)=$CH_2$ (180) | 80 | 1290 | 5.2 (150° C.) |
| B | [structure with $CH=CH_2$, $CH_3$–Si–$CH_3$, O–$CH_2$–phenyl–C($CH_3$)=$CH_2$]$_n$ | [phenol-$CH_2$]$_n$–OH (107) | $CH_3$ HC=$CH_2$ / Cl–$CH_2$–Si–phenyl–C($CH_3$)=$CH_2$ / $CH_3$ (129) | 80 | 996 | 5.1 (150° C.) |
| C | HO–phenyl–C($CH_3$)$_2$–phenyl–O–$CH_2$–Si($CH_3$)$_2$–phenyl–C($CH_3$)=$CH_2$ | HO–phenyl–C($CH_3$)$_2$–phenyl–OH (114) | Cl–$CH_2$–Si($CH_3$)$_2$–phenyl–C($CH_3$)=$CH_2$ (180) | 80 | 1288 | 52 (52° C.) |
| D | HO–phenyl–C($CH_3$)$_2$–phenyl–O–$CH_2$–Si($CH_3$)$_2$–phenyl–CH=$CH_2$ | HO–phenyl–C($CH_3$)$_2$–phenyl–OH (114) | Cl–$CH_2$–Si($CH_3$)$_2$–phenyl–CH=$CH_2$ H (169) | 80 | 1230 | 40 (25° C.) |
| E | HO–phenyl–C($CH_3$)$_2$–phenyl–OCH$_2$–Si($CH_3$)$_2$–C$_3$H$_6$OC(=O)–C($CH_3$)=$CH_2$ | HO–phenyl–C($CH_3$)$_2$–phenyl–OH (114) | Cl–$CH_2$–Si($CH_3$)$_2$–C$_3$H$_6$–OC(=O)–C($CH_3$)=$CH_2$ (188) | 80 | 1326 | 56 (25° C.) |

Synthesis 2

In a four-necked flask equipped with a thermometer, agitator, dropping funnel and reflux condenser, reaction product A resulting from Synthesis 1 was reacted with epichlorohydrin in the presence of NaOH according to a conventional procedure. There was obtained the following epoxy compound designated reaction product F.

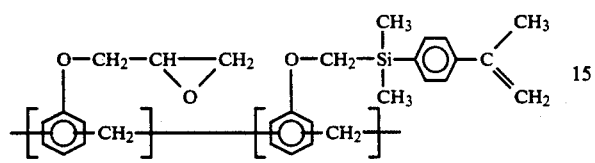

It had a silylation of 80% and an epoxy equivalent of 1,320.

The structure of reaction product F was identified by IR and NMR spectra.

Synthesis 3

A 1-liter, four-necked flask equipped with a thermometer, agitator, dropping funnel and reflux condenser was charged with 120 grams of the following phenol novolak resin having conjugated double bonds:

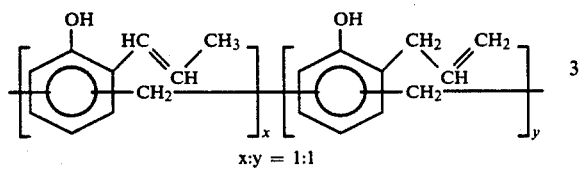

x:y = 1:1

100 grams of methyl isobutyl ketone, 200 grams of toluene, and 0.04 grams of a 2-ethylhexanol-modified chloroplatinic acid solution having a platinum concentration of 2%. After azeotropic dewatering was effected for one hour, 50 grams of the following organopolysiloxane:

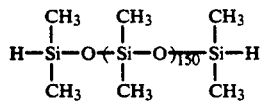

was added dropwise at the reflux temperature over 30 minutes. The reaction mixture was agitated at the same temperature for a further 4 hours to complete reaction. The flask contents were washed with water and stripped of the solvents in vacuum, yielding a white turbid, opaque material (designated copolymer G) having a viscosity of 1,370 centistokes at 150° C.

Synthesis 4

A 1-liter, four-necked flask equipped with a thermometer, agitator, dropping funnel and reflux condenser was charged with 120 grams of the following epoxy resin having conjugated double bonds:

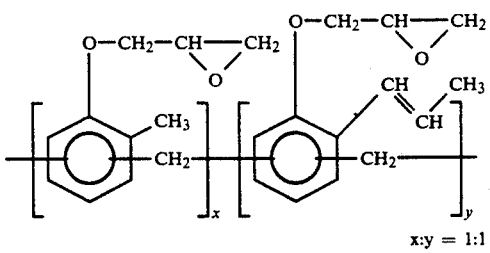

x:y = 1:1

100 grams of methyl isobutyl ketone and 200 grams of toluene. Then 50 grams of the following organopolysiloxane:

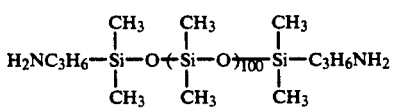

was added dropwise at the reflux temperature over 30 minutes. The reaction mixture was agitated at the same temperature for a further 4 hours to complete the reaction. The flask contents were washed with water and stripped of the solvents in vacuum, yielding a white turbid, opaque material (designated copolymer H) having a viscosity of 1,180 centistokes at 150° C.

Synthesis 5

A 1-liter, four-necked flask equipped with a thermo meter, agitator, dropping funnel and reflux condenser was charged with 64.5 grams (0.5 mol) of $(CH_3)_2SiCl_2$, 69.3 grams (0.3 mol) of

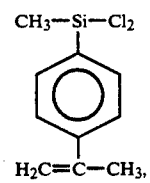

and 29.9 grams (0.2 mol) of $CH_3SiC_3$. With stirring at room temperature, 39.6 grams (2.2 mol) of water was slowly added dropwise through the dropping funnel. After the aqueous layer was separated, the organic layer was washed with water until it became neutral. After azeotroping off water, the organic layer was filtered and stripped, yielding a transparent material having a viscosity of 860 centistokes at 150° C. It was a silicon compound (designated reaction product I) having a double bond conjugated with an aromatic ring as shown by the following structure:

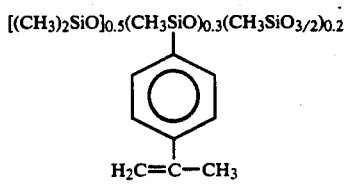

Synthesis 6

As in Synthesis 1, 119 grams of the following compound:

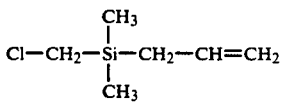

as the silicon compound was reacted with the phenol novolak resin, obtaining a reaction product J having a silylation of 80% and an OH equivalent of 980.

It is to be noted that reaction product J is outside the scope of the invention.

Synthesis 7

As in Synthesis 3, 120 grams of a phenol novolak resin free of conjugated double bonds:

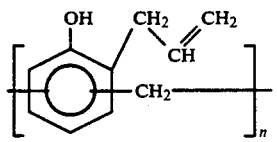

was reacted with 5.0 grams of an organopolysiloxane:

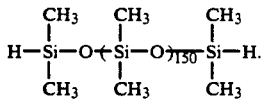

There was obtained a white turbid, opaque material (designated copolymer K) having a viscosity of 1,300 centistokes at 150° C.

It is to be noted that copolymer K is outside the scope of the invention.

EXAMPLE 1-15

Comparative Examples 1-6

To 100 parts of N,N'-4,4'-diphenylmethane bismaleimide were added reaction products A to F and I, copolymers G and H obtained in Synthesis examples and a curing catalyst in the amounts reported in Table 1. To the mixtures were further added 260 parts of quartz powder, 1.5 parts of γ-glycidoxypropyltrimethoxysilane, 1.5 parts of wax E, and 1.0 part of carbon black. The resulting blends were melt mixed in a hot twin roll mill until they became uniform. In this way, twenty (20) thermosetting resin compositions (Examples 1 to 15 and Comparative Examples 1 to 6) were obtained.

These resin compositions were examined by the following tests,

Spiral Flow

Spiral flow was measured using a mold according to the EMMI standards at 175° C. under a pressure of 70 kg/cm².

Mechanical Strength (Flexural Strength and Flexural Modulus)

According to JIS K-6911, test bars of 10×4×100 mm were prepared by molding for 2 minutes at 175° C. under a pressure of 70 kg/cm² and post curing for 4 hours at 180° C. The bars were measured for strength at 25° C. and 250° C.

Glass Transition Temperature

Using a dilatometer, test pieces having a diameter of 4 mm and a length of 15 mm were heated at a rate of 5° C./min.

Crack Resistance

A silicon chip dimensioned 9.0×4.5×0.5 mm was bonded to a 14PIN-IC frame of 42 alloy and encapsulated with a resin composition by molding at 175° C. for 2 minutes and post curing at 180° C. for 4 hours. The assembly was subjected to repetitive thermal cycles of −196° C./1 min. and 260° C./30 sec. The resin encapsulant was observed for crack occurrence at the end of 200 cycles. For each resin composition, 50 samples were tested.

Al Electrode Deformation

A deformation measuring element in the form of a silicon chip of 3.4×10.2×0.3 mm having an aluminum electrode evaporated thereon was bonded to a 14PIN-IC frame of 42 alloy and encapsulated with a resin composition by molding at 185° C. for 2 minutes and post curing at 180° C. for 4 hours. The assembly was subjected to repetitive thermal cycles of −196° C./1 min. and 260° C./30 sec. The deformation of the aluminum electrode was measured at the end of 200 cycles. For each resin composition, 3 samples were tested.

Moisture Resistance

Samples were molded from a resin composition to a 14 pin DIP IC configuration and placed in a high pressure oven at 121° C. and humidity 100% for 100 hours. Those samples in which aluminum wirings were exposed were rejected. Percent rejection was calculated.

The results of these tests are also shown in Table 2.

TABLE 2

| Ingredient | \multicolumn{11}{c}{Examples} |
| | 1 | 2 | 3 | 4 | 5 | 6 | 7 | 8 | 9 | 10 | 11 |
| --- | --- | --- | --- | --- | --- | --- | --- | --- | --- | --- | --- |
| N, N'-4,4'-diphenyl-methanebismaleimide (parts by weight) | 100 | 100 | 100 | 100 | 100 | 100 | 100 | 100 | 100 | 100 | 100 |
| Reaction product | A | B | C | D | E | F | — | — | A | B | F |
| (parts by weight) | 100 | 80 | 103 | 99 | 106 | 103 | | | 100 | 80 | 103 |
| Copolymer (parts by weight) | — | — | — | — | — | — | G | H | | | G |
| | | | | | | | 168 | 216 | | | 168 |
| Epoxy resin* (parts by weight) | — | — | — | — | — | — | — | — | 15.5 | 16.1 | — |
| Phenol resin** (parts by weight) | — | — | — | — | — | — | — | — | — | — | 8.6 |
| Triphenyl phosphine (parts by weight) | 1.0 | 1.0 | 1.0 | 1.0 | 1.0 | 1.0 | 1.0 | 1.0 | 1.0 | 1.0 | 1.0 |
| Dicumyl peroxide (parts by weight) | 0.5 | 0.5 | 0.5 | 0.5 | 0.5 | 0.5 | 0.5 | 0.5 | 0.5 | 0.5 | 0.5 |
| Properties | | | | | | | | | | | |
| Spiral flow (inch) | 21 | 20 | 24 | 22 | 21 | 23 | 22 | 20 | 22 | 20 | 21 |

TABLE 2-continued

| | | | | | | | | | | | |
|---|---|---|---|---|---|---|---|---|---|---|---|
| Flexural strength (25° C. kg/mm²) | 12.2 | 12.5 | 12.4 | 13.0 | 12.6 | 12.2 | 12.7 | 12.0 | 12.6 | 12.7 | 12.7 |
| Flexural strength (250° C. kg/mm²) | 4.0 | 4.2 | 3.9 | 4.0 | 4.1 | 4.0 | 4.2 | 3.9 | 4.1 | 4.1 | 4.2 |
| Flexural modulus (kg/mm²) | 1350 | 1410 | 1380 | 1420 | 1440 | 1450 | 1250 | 1260 | 1490 | 1420 | 1390 |
| Glass transition temperature (°C.) | 260 | 261 | 257 | 259 | 255 | 259 | 261 | 255 | 258 | 259 | 258 |
| Crack resistance (%) | 2 | 2 | 3 | 2 | 2 | 1 | 3 | 0 | 0 | 2 | 1 |
| Al electrode deformation (μm) | 0 | 0 | 0 | 0 | 0 | 0 | 0 | 0 | 0 | 0 | 0 |
| Moisture resistance (%) | 0 | 0 | 0 | 0 | 0 | 0 | 0 | 0 | 0 | 0 | 0 |

| | Examples | | | | Comparative Examples | | | | | |
|---|---|---|---|---|---|---|---|---|---|---|
| Ingredient | 12 | 13 | 14 | 15 | 1 | 2 | 3 | 4 | 5 | 6 |
| N, N'-4,4'-diphenyl-methanebismaleimide (parts by weight) | 100 | 100 | 100 | 100 | 100 | — | — | — | 100 | 100 |
| Reaction product (parts by weight) | | | A 50 | I 100 | — | A 100 | — | — | J 76 | — |
| Copolymer (parts by weight) | H 216 | H 108 | — | — | — | — | G 168 | — | — | K 84 |
| Epoxy resin* (parts by weight) | 161 | — | — | — | — | 15.5 | 161 | 60 | — | — |
| Phenol resin** (parts by weight) | — | 88 | — | — | — | — | — | 33 | — | — |
| Triphenyl phosphine (parts by weight) | 2.0 | 2.0 | 1.0 | — | 1.0 | 1.0 | 2.0 | 1.0 | 1.0 | 1.0 |
| Dicumyl peroxide (parts by weight) | 1.0 | 1.0 | 0.5 | 0.5 | 0.5 | 0.5 | 1.0 | — | 0.5 | 0.5 |
| Properties | | | | | | | | | | |
| Spiral flow (inch) | 23 | 24 | 21 | 20 | 5 | 20 | 23 | 21 | 27 | 24 |
| Flexural strength (25° C. kg/mm²) | 12.0 | 12.6 | 12.7 | 12.4 | 16.0 | 12.0 | 12.3 | 12.2 | 8.0 | 6.2 |
| Flexural strength (250° C. kg/mm²) | 3.9 | 4.0 | 4.2 | 4.0 | 4.2 | 1.2 | 1.4 | 1.2 | 0.9 | 0.8 |
| Flexural modulus (kg/mm²) | 1240 | 1280 | 1230 | 1200 | 1520 | 1410 | 1250 | 1380 | 1390 | 1310 |
| Glass transition temperature (°C.) | 256 | 259 | 260 | 250 | 261 | 165 | 162 | 165 | 142 | 145 |
| Crack resistance (%) | 0 | 0 | 0 | 0 | 100 | 100 | 80 | 100 | 100 | 90 |
| Al electrode deformation (μm) | 0 | 0 | 0 | 0 | 0.8 | 0.7 | 0.7 | 0.6 | 0.8 | 0.8 |
| Moisture resistance (%) | 0 | 0 | 0 | 0 | 50 | 20 | 25 | 10 | 45 | 55 |

*EOCN1020(65) by Nihon Kayaku K. K.
**TD2131 by Dai-Nihon Ink Chemical K. K.

As seen from Table 2, thermosetting resin compositions containing an N-substituted maleimide group-containing compound in admixture with a silicon compound having conjugated double bonds (Examples 1-15) have a high glass transition temperature, increased flexural strength at high temperatures, crack resistance, and moisture resistance compared with thermosetting resin compositions which contain either one or neither of these compounds (Comparative Examples 1-6).

There have been described thermosetting resin compositions which are relatively stress free, well bondable and well workable, and cure into heat resistant products which maintain mechanical strength and water resistance at high temperatures. The present resin compositions meet the requirements for advanced thermosetting resins and find use as various electrical insulating materials, structural materials, adhesives, powder coating materials, and semiconductor encapsulating materials.

Although some preferred embodiments have been described, many modifications and variations may be made thereto in the light of the above teachings. It is therefore to be understood that within the scope of the appended claims, the invention may be practiced otherwise than as specifically described.

We claim:

1. A thermosetting resin composition comprising in admixture,
   (a) a maleimide compound having at least one N-substituted maleimide group in the molecule thereof and
   (b) a silicon compound having a conjugated double bond.

2. The composition of claim 1 wherein maleimide (a) has the general formula:

wherein R is an n-valent organic group and n is an integer of 1 to 20.

3. The composition of claim 2 wherein n is an integer of 1 to 6.

4. The composition of claim 2 wherein n is equal to 2.

5. The composition of claim 2 wherein substituent R is selected from the group consisting of

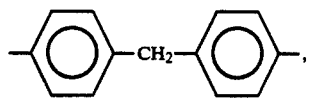

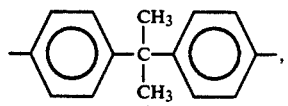

-continued

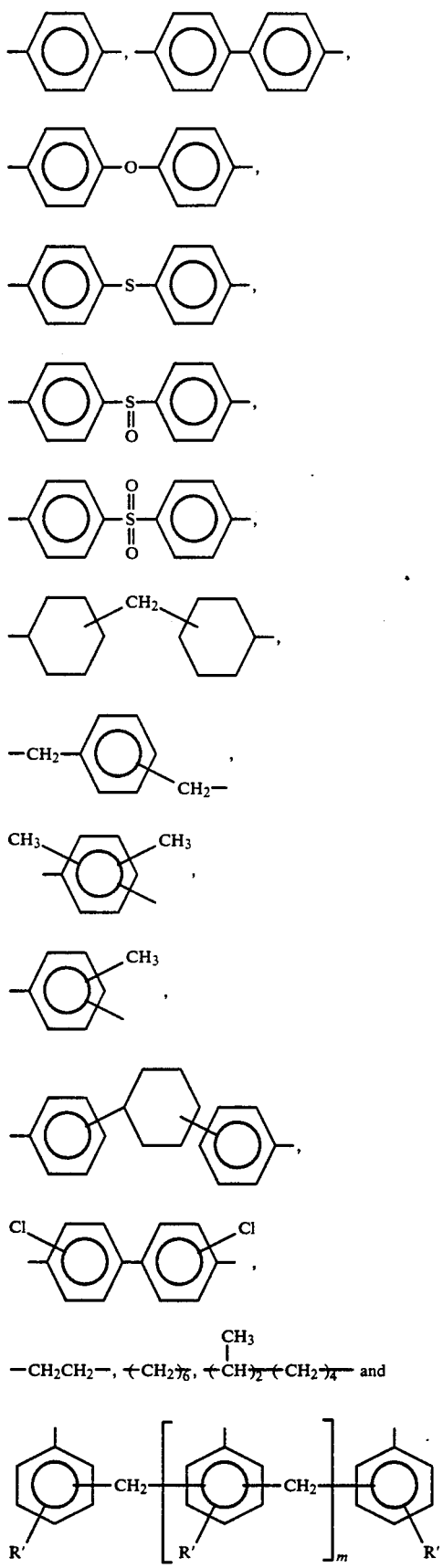

wherein R' is a hydrogen atom, a $C_{1-4}$ alkyl group or a halogen atom, and m is an integer of from 0 to 18.

6. The composition of claim 1 wherein maleimide (a) is selected from the group consisting of
N,N'-disphenylmethane bismaleimide,
N,N'-phenylmethane bismaleimide,
N,N'-diphenyl ether bismaleimide,
N,N'-diphenyl sulfone bismaleimide,
N,N'-dicyclohexylmethane bismaleimide,
N,N'-xylene bismaleimide,
N,N'-tolylene bismaleimide,
N,N'-xylylene bismaleimide,
N,N'-diphenylcyclohexane bismaleimide,
N,N'-dichlorodiphenyl bismaleimide,
N,N'-(2,2-diphenylpropane) bismaleimide,
N,N'-diphenyl ether bismaleimide,
N,N'-diphenyl sulfone bismaleimide,
N,N'-ethylene bismaleimide,
N,N'-hexamethylene bismaleimide,
N,N'-(dimethylhexamethylene) bismaleimide.

7. The composition of claim 1 wherein the conjugated double bond organic group is selected from the group consisting of $$-\underset{\underset{CH_2}{\|}}{C}-CH=CH_2, \quad -C_3H_6O-\underset{\underset{O}{\|}}{C}-\underset{\underset{CH_2}{\|}}{C}-CH_3,$$

$$-\underset{\underset{CH_2}{\|}}{C}-\underset{\underset{}{\overset{CH_3}{|}}}{C}=CH_2, \quad -\underset{\underset{CHCH_3}{\|}}{C}-CH=CH_2, \quad -\underset{\underset{CHCH_3}{\|}}{C}-CH=CHCH_3,$$

$$-\underset{\underset{CHCH_3}{\|}}{C}-\underset{\underset{}{\overset{C_2H_5}{|}}}{C}=CHCH_3, \quad -\underset{\underset{CHCH_3}{\|}}{C}-\underset{\underset{}{\overset{CH3}{|}}}{C}=CH_2, \quad -\underset{\underset{CH_2}{\|}}{C}-CH=CHCH_3,$$

$$-\underset{\underset{CH_2}{\|}}{C}-\underset{\underset{}{\overset{C_2H_5}{|}}}{C}=CH_2, \quad -\underset{\underset{CH_2}{\|}}{C}-\underset{\underset{}{\overset{CH_3}{|}}}{C}=CHCH_3,$$

$$-\underset{\underset{CHCH_3}{\|}}{C}-\underset{\underset{}{\overset{CH_3}{|}}}{C}=CHCH_3, \text{ and } -\underset{\underset{CHCH_3}{\|}}{C}-\underset{\underset{}{\overset{C_2H_5}{|}}}{C}=CH_2,$$

―⌬―CH=CH₂,

―⌬―CH=CH―CH₃,

―⌬―CH=CH―C₂H₅,

―⌬―C(CH₃)=CH₂, and ―⌬―C(CH₃)=CHCH₃.

8. The composition of claim 1 wherein silicon compound (b) is selected from copolymers of a novolak resin having conjugated double bonds and an organopolysiloxane represented by the general formula:

$$R^5{}_a R^6{}_b SiO_{(4-a-b)/2} \quad (II)$$

wherein $R^5$ is a hydrogen atom, a halogen atom or an organic group having a functional group, $R^6$ is a substituted or unsubstituted monovalent hydrocarbon group having 1 to 10 carbon atoms, a is a number of from 0.001 to 0.25, b is a number of from 1.75 to 2.0, and $1.7 < a + b < 2.3$ and wherein the number of silicon atoms per molecule is an integer of from 20 to 1,000 and the number of organic groups having a functional group directly attached to a silicon atom per molecule is an integer of from 1 to 5.

9. The composition of claim 1 wherein said maleimide compound (a) comprises 100 parts by weight and said silicon compound (b) comprises 20 to 400 parts by weight.

10. A cured product obtained by curing the composition of claim 1.

11. The composition of claim 1 wherein the conjugated double bond of silicon compound (b) is attached to a silicon atom thereof and is an $\alpha,\beta$-unsaturated bond-containing organic group having 4 to 10 carbon atoms.

12. The composition of claim 1 wherein the conjugated double bond of silicon compound (b) has an aromatic ring and is represented by the general formula:

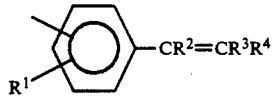

wherein $R^1$ is a hydrogen atom, a halogen atom or a halogen-substituted or unsubstituted alkyl group having 1 to 6 carbon atoms, and $R^2$, $R^3$ and $R^4$ are independently selected from a hydrogen atom or an alkyl group having 1 to 4 carbon atoms.

13. The composition of claim 1 wherein the conjugated having a conjugated double bond comprises at least one member of formulae (1) to (10) selected from the group consisting of

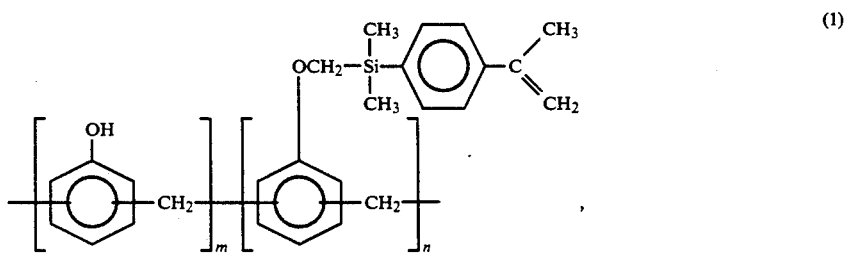

(1)

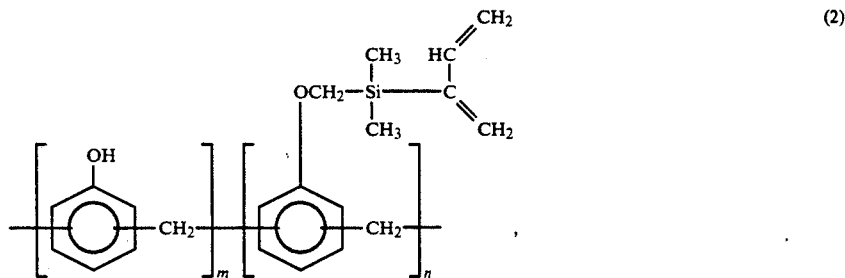

(2)

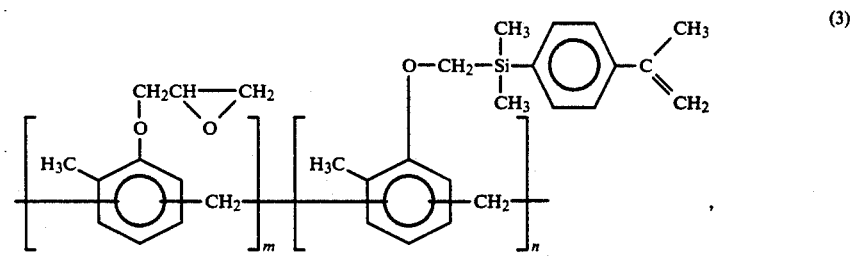

(3)

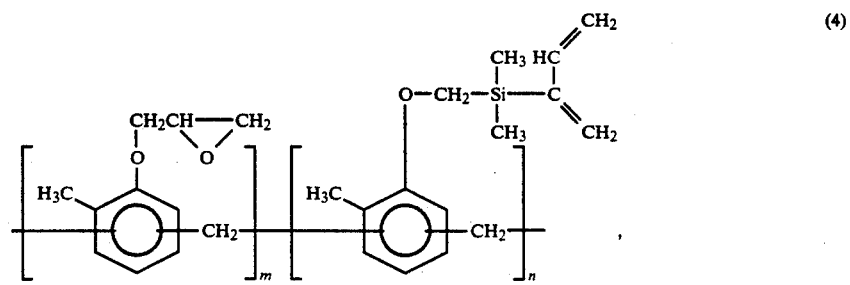

(4)

-continued

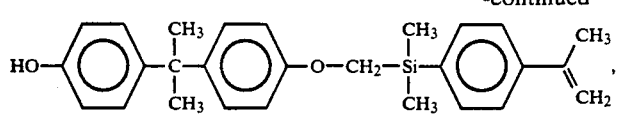 (5)

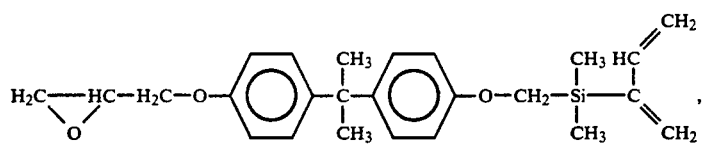 (6)

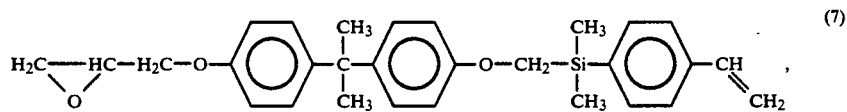 (7)

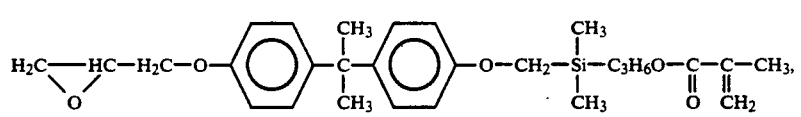 (8)

$((CH_3)_2SiO)_{0.5}(CH_3SiO)_{0.3}(CH_3SiO_{3/2})_{0.2}$, and (9)

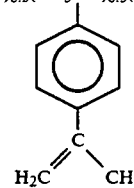

$((CH_3)_2SiO)_{0.4}(CH_3SiO)_{0.4}(CH_3SiO_{3/2})_{0.2}$. (10)

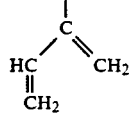

14. The composition of claim 9 wherein said silicon compound (b) comprises 50 to 200 parts by weight.

15. The composition of claim 1 which comprises 0.01 to 10 parts by weight of a catalyst.

16. The composition of claim 15 wherein the catalyst is an organic peroxide.

17. The composition of claim 1 which comprises 50 to 700 parts by weight of inorganic filler.

18. The composition of claim 1 which comprises an additive selected from a mold release agent, a pigment, a surface-treating agent or a curing agent.

* * * * *